No. 658,712. Patented Sept. 25, 1900.
A. W. GRANT.
DEVICE FOR EQUIPPING VEHICLE WHEELS WITH RUBBER TIRES.
(Application filed Aug. 14, 1897.)
(No Model.) 3 Sheets—Sheet 1.
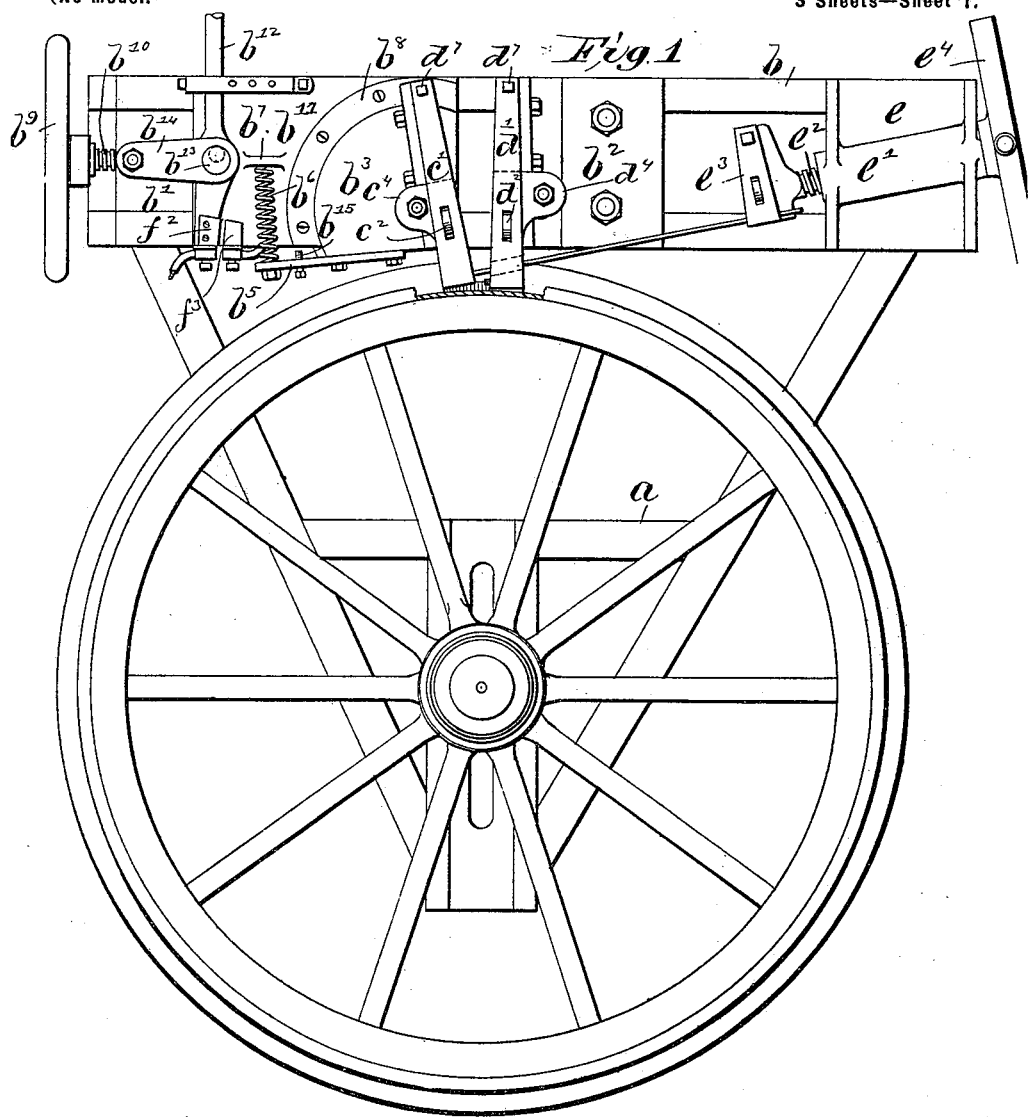
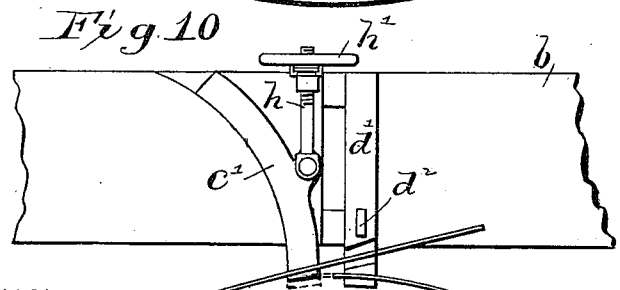
Witnesses
G. M. Gridley
Chas. J. Welch
Inventor
Arthur W. Grant
By his Attorney No. 658,712. Patented Sept. 25, 1900.
A. W. GRANT.
DEVICE FOR EQUIPPING VEHICLE WHEELS WITH RUBBER TIRES.
(Application filed Aug. 14, 1897.)
(No Model.) 3 Sheets—Sheet 2.
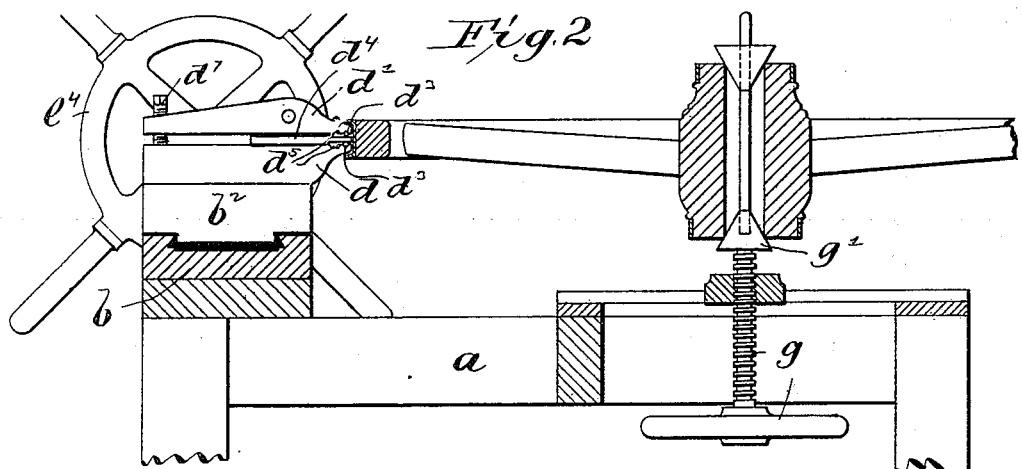
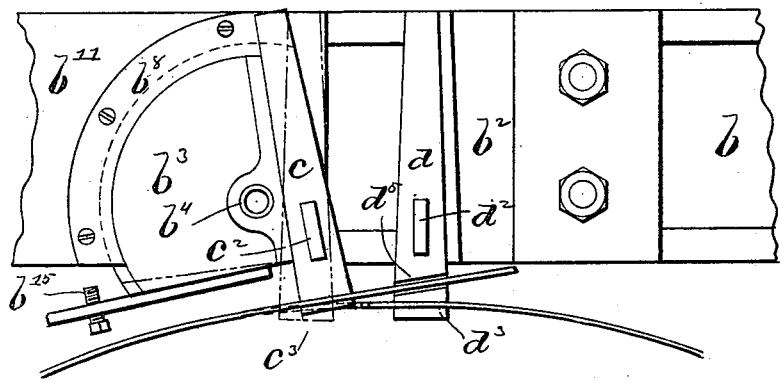
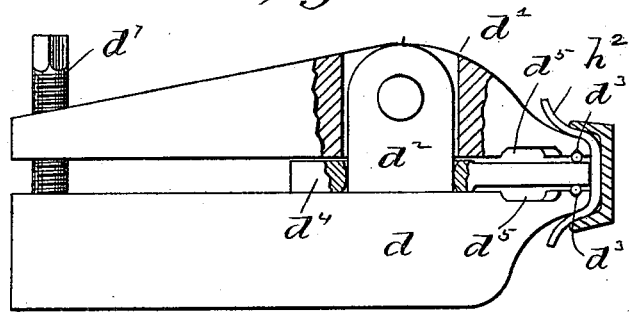
Witnesses
G. M. Gridley
Chas. J. Welsh
Inventor
Arthur W. Grant
By his Attorney

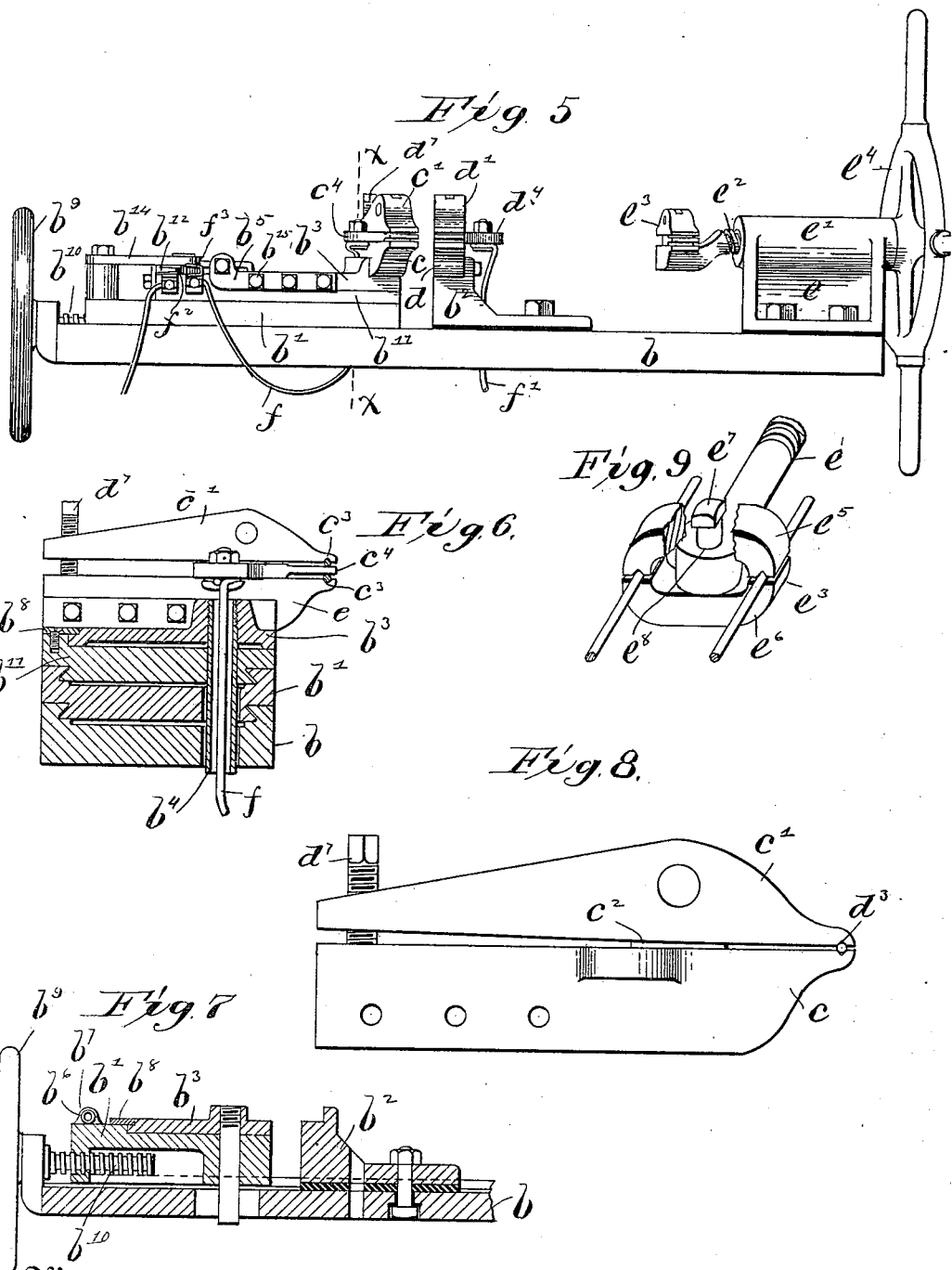

UNITED STATES PATENT OFFICE.

ARTHUR W. GRANT, OF SPRINGFIELD, OHIO, ASSIGNOR, BY MESNE ASSIGNMENTS, TO THE CONSOLIDATED RUBBER TIRE COMPANY, OF JERSEY CITY, NEW JERSEY.

DEVICE FOR EQUIPPING VEHICLE-WHEELS WITH RUBBER TIRES.

SPECIFICATION forming part of Letters Patent No. 658,712, dated September 25, 1900.

Application filed August 14, 1897. Serial No. 648,333. (No model.)

*To all whom it may concern:*

Be it known that I, ARTHUR W. GRANT, a citizen of the United States, residing at Springfield, in the county of Clark and State of Ohio, have invented certain new and useful Improvements in Devices for Equipping Vehicle-Wheels with Rubber Tires, of which the following is a specification.

My invention relates to devices for equipping vehicle-wheels with rubber tires.

The object of my invention is to provide a machine by means of which rubber tires having retaining-bands of metal can be secured to the wheel-rims, the retaining-bands tightened thereon, and the ends of the retaining-bands united together while the tire is in the rim.

My invention consists in the constructions and combinations of parts hereinafter described, and set forth in the claims.

In the accompanying drawings, Figure 1 is a plan view of a device embodying my invention, the parts being shown in position for securing the rubber tire. Fig. 2 is a transverse sectional view of a portion of the same. Fig. 3 is a plan view of some of the parts in detail, showing the positions of the holding-jaws. Fig. 4 is a side elevation of the holding-jaws in detail and partly in section. Fig. 5 is a side elevation showing the holding-jaws and the wire-tightening devices. Fig. 6 is a transverse sectional view on the line $x\ x$ in Fig. 5. Fig. 7 is a longitudinal sectional view showing a modification. Fig. 8 is a detail view of one of the holding-jaws, showing a modification. Fig. 9 is a detail view showing a modification in the holding devices of the band-tightener. Fig. 10 is a detail view showing a modification in the means employed for adjusing one of the band-holding devices.

Like parts are represented by similar letters of reference in the several views.

It has become common in the art of equipping vehicle wheels with rubber tires to employ retaining-bands of metal extending through the rubber portion of the tire, and to be effective the retaining band or bands should be below or within the peripheries of the projecting sides of the wheel rim or metal felly, which is generally formed in the nature of a channel. Of these devices the most successful seem to be those which employ two independent bands, which are usually formed of common iron wire extending entirely through the rubber, the ends of each wire being united together, so as to form two independent endless bands. Rubber tires of this kind have been placed on the wheel-rims after the ends of the wires have been united by welding, brazing, or otherwise, in which case the endless tire is forced over the sides of the receiving-channel. In other cases the tires have been formed in the channel and the ends of the wires twisted together; but in all the methods heretofore employed difficulty has been experienced in getting the bands of the exact length necessary to hold the tire sufficiently tight on the wheel-rim.

In my present invention I employ a device by which the wheel to be equipped is held in a proper position, one end of the retaining-band or bands being firmly held while the band or bands are tightened to the proper degree. A movable or adjustable holding device is then caused to engage the other ends of the retaining bands or wires, the wires severed, and the movable holding device brought into juxtaposition with the other holding device, so that the ends of the band or bands may be united together while the bands are under tension and the tire in the rim.

In carrying out this invention I employ the following instrumentalities: A main frame or table $a$ is adapted to support a bed $b$, on which there is located a slidingly-movable head $b'$ and a stationary head $b^2$. The stationary head $b^2$ is provided with a band-holding device, which consists, preferably, of jaws $d$ and $d'$, the lower one of which is secured rigidly to the head $b^2$ and the upper one connected to the lower one, preferably by means of a tongue or upright $d^2$, to which the upper one is pivoted, the upper jaw being slotted to receive this upright. The movable head $b'$ has supported thereon a similar band-holding device, preferably consisting of a pair of jaws $c$ and $c'$, connected together with one preferably pivoted in the manner before described. Each of these holding devices is provided with a clamping-screw $d^7$, which is preferably located at the rear of the pivotal connection and is screw-threaded in the upper jaw and adapted to bear on the lower jaw, so that as the clamping-screw is turned the front or working ends of the jaws will be brought together, so as to clamp the ends of the retaining wires or bands which are to be operated upon. It is obvious that this particular construction may be variously modified so long as the holding devices will properly hold the ends of the retaining-bands, which is the principal function they are adapted to perform. The jaws will be formed at their front or working ends with proper gripping devices. In the present drawings I have shown them in the form of V-shaped notches $d^3$ and $c^3$, which are especially adapted to grip a band round in cross-section, such as ordinary wire. When two such bands are employed in the rubber tire, I employ an intermediate or auxiliary plate in each of the holding devices, as shown at $c^4$ and $d^4$. This plate in each case is fitted loosely between the jaws and is slotted, as shown, to fit over the tongue or upright $c^2$ $d^2$, the jaws of the respective holding devices being adapted to clamp the bands on opposite sides of the intermediate plates. When one band only is employed, this intermediate or auxiliary plate may be dispensed with, the band being clamped between the respective jaws, as shown in Fig. 8.

In order that the bands may be properly tightened before the ends are secured, it is desirable that one set of the band-holding devices be adjustable, so as to assume different angles with reference to the other holding device, and it is also essential that means be provided for varying the distance between the respective holding devices. To accomplish this, I preferably employ a swiveled or pivoted plate $b^3$, which is mounted on the sliding head $b'$ and connected thereto by a journal $b^4$, which extends down through the head $b'$ and serves to connect the plate firmly to the head and at the same time cause it to travel therewith when the head is moved on its support or ways. This shaft or journal $b^4$ is preferably hollow for the purpose hereinafter referred to. The plate $b^3$ is provided with an arm $b^5$, which extends therefrom and bears against a spring $b^6$, the other end of the spring being in contact with a lug or projection $b^7$ on the head $b'$, so that the spring tends to turn the plate $b^3$ on the shaft or journal $b^4$, and thus bring the band-holding device which is mounted on said plate at an angle to the other or stationary band-holding device. I also provide an adjustable stop to limit the movement of the plate $b^3$, so that it may be moved to a predetermined position against the tension of the spring. I have shown for this purpose a set-screw $b^{15}$, which is extended through the arm $b^5$ and adapted to contact with the side of the supporting-head $b'$. I preferably construct the plate at one side on the arc of a circle whose center is at the center of the shaft or journal $b^4$ and provide on its periphery a flange or way, which fits in the correspondingly-recessed bearing in the head $b'$ and held therein by a retaining flange or plate $b^8$, this construction being preferable to retain the holding devices consisting of the jaws $c$ and $c'$ in any position of adjustment which they may assume with reference to the movable head $b'$.

To provide for stretching or tightening the bands, and thus firmly clamping the rubber portion of the tire to the wheel-rim, I employ an independent stretching or tightening device, which is located in the proper relative position to the respective holding devices just described, preferably on the same base $b$. In the present case I have illustrated a stationary head $e$, secured to the base $b$ and having a bearing $e'$, in which is mounted a screw-threaded shaft $e^2$. This shaft $e^2$ is provided in the usual manner with means to prevent it from turning, and it is engaged at one end by a screw-threaded hand-wheel $e^4$, which serves as a nut for the screw, the hand-wheel being mounted in a suitable manner in the bearing $e'$ and adapted as it is turned in either direction to move the screw-threaded shaft out of or into the head $e$. On this shaft is mounted a holding device, preferably in the nature of clamping-jaws, which is adapted to engage and hold the ends of the retaining-bands, so that as the hand-wheel is turned the band or bands held by these clamps will be moved longitudinally, so as to stretch or tighten the same.

As before stated, the movable head $b'$ is slidingly mounted on the base $b$, and it is adapted to be adjusted to or from the stationary head by means of a hand-wheel $b^9$ and a screw-threaded shaft $b^{10}$ in a well-known manner.

In order that the band or bands to be tightened may be gripped by the stretching or tightening device while the bands encircle the wheel, the head which supports the tightening device is preferably located at an angle to the base and on a line which would be substantially tangent to the wheel-rim when the wheel-rim is supported on the table, and it is because of this tangential position assumed by the retaining band or bands in being tightened that one set of the holding devices is supported adjustably, so as to be moved to different angular positions with reference to the other holding device. In other words, the jaws $c$ and $c'$ of this adjustable holding device will normally stand in such a position that the retaining wires or bands which extend tangentially from the wheel-rim to the tightening or stretching device will pass through the gripping portions of said jaws at right angles to the jaws. The other or stationary holding device, consisting of the jaws $d\ d'$, is provided with means to permit the passage of the band or bands around or through these jaws without interfering with their gripping or holding functions. In the present case I have shown this accomplished by constructing these jaws $d$ and $d'$ with auxiliary openings or notches $d^5$ back of the clamping portions $d^3$ of said jaws and on a line with the holding grooves in the jaws $c$ and $c'$ when said jaws are in their normal position and under the tension of the spring $b^6$, as shown in Figs. 1 and 3.

For uniting the ends of the bands I preferably employ electric welding, and for this purpose the head $b^2$ is insulated from the base $b$, the head $e$ being also preferably insulated. An electrical connection is made with the respective jaws by the conductors $f$ and $f'$, the conductor $f$ passing up through the hollow shaft $b^4$ and the conductor $f'$ extending through a similar opening in the head $b^2$. The electrical connection is preferably made with the intermediate pieces $c^4$ and $d^4$ of the holding devices, and for this reason the said intermediate pieces are preferably formed of metal, which is a good electrical conductor. They are also formed with laterally-projecting lugs to which the connections may be readily made. When the intermediate pieces are dispensed with, the connection will be made directly to one of the jaws of the holding device.

In Figs. 1, 5, and 6 I have shown an auxiliary sliding support $b^{11}$, which is mounted on the slidingly-movable head $b'$, and the adjustable holding devices $c$ and $c'$ are mounted on this auxiliary movable support, which is capable of a limited movement on the slidingly-movable head $b'$ through the agency of a lever $b^{12}$. This lever is provided with a boss $b^{13}$, which is eccentrically mounted in a link $b^{14}$, pivoted on the head $b'$, so that by moving the lever $b^{12}$ the support $b^{11}$ is moved on the movable head $b'$. When this construction is employed, I provide an automatic switch $f^2$ on the end of the lever $b^{12}$, which is adapted to contact with a stationary part $f^3$. The conductor $f$ is connected through this switch, so that when the lever $b^{12}$ is moved to a predetermined position the electrical connection will be broken. In Fig. 7 I have shown this auxiliary support $b^{11}$ dispensed with, the adjustable holding devices $c$ and $c'$ being mounted directly on the slidingly-movable head $b'$.

In Fig. 9 I have shown a modification in the band-holder $e^3$ on the tension device $e$. In this case the screw-threaded shaft $e$ has jaws $e^5$ and $e^6$ pivotally mounted thereon by means of a clamping-bolt $e^7$, which passes through an eye $e^8$, formed on the end of the shaft and arranged to clamp the jaws $e^5$ and $e^6$ together, the respective bands being held at the respective ends of the jaws and on opposite sides of the pivoted clamping-bolt $e^7$. The result of this construction is that an equal tension will be placed on each of the bands when two bands are employed, and the jaws being adjustable upon the pivotal bolt $e^7$ will compensate for any unequal length which may exist in the bands while being stretched or tightened.

Any suitable means may be provided for supporting the wheel to which the rubber tire is to be applied. The wheel is preferably located in a horizontal position during the operation, and for this purpose the table or frame may be extended and is preferably provided with an adjustable support $g$, having a cone-bearing $g'$ to support the wheel-hub and preferably screw-threaded, so as to adjust the wheel up or down so as to bring it to the proper position opposite the band-holding devices.

In Fig. 10 I have shown a modification in the adjustment of the holding devices $c$ $c'$. In this case the plate $b^3$ is dispensed with and the jaws slidingly mounted in a curved way and adapted to be moved in or out by means of a screw-threaded link $h$, operated by a suitable nut or hand-wheel $h'$, so as to move the holding device to different positions of longitudinal as well as angular adjustment.

The operation of equipping a wheel with a rubber tire by means of my improved machine as thus described is as follows: A strip of rubber slightly longer than sufficient to pass around the wheel has passed therethrough a retaining band or bands. The tire is then placed on the wheel and within the channel-iron. One end of each of the bands, assuming that two are employed, is clamped in the stationary holding devices $d$ and $d'$, with one end of the rubber resting against the jaws of the holding device. The bands from the opposite end of the rubber are projected through the jaws $c$ and $c'$ of the adjustable holding device and through the openings $d^5$ in the stationary holding device and the ends of the wires clamped by the clamp $e^3$ of the tension device $e$, the end of the rubber resting against the jaws $c$ and $c'$. The hand-wheel $e^4$ is now operated, so as to move the threaded shaft $e^2$, and with it the clamping device $e^3$, and thus pull the bands gripped thereby longitudinally through the jaws, one end of the wires being held firmly by the stationary jaws. The bands are tightened so as to compress the rubber between the bands and the wheel-rim. When they are sufficiently tight, the movable band-holding devices $c$ and $c'$ are caused to grip the bands which pass through the same, and after this the ends thereof, which project from the jaws $c$ and $c'$ to the tension device, are cut off. When the pivoted or swivelly-mounted plate is employed for supporting the adjustable jaws with the spring, the tension on the wires or bands will, as soon as the bands are cut, cause the plate $b^3$ to turn on its pivoted support and cause the band-holding devices $c$ and $c'$ to assume a position parallel to the holding devices $d$ and $d'$. This will bring the severed ends of the bands opposite the remaining ends, which are held by the holding devices $d$ and $d'$. By moving the head $b'$ the two ends may be brought in contact. The electric current being now turned on through the conductors $f$ and $f'$, the contacting ends of the bands may be united by moving the holding devices $c$ and $c'$ either through the medium of the hand-wheel $b^9$ or the lever $b^{12}$. When the auxiliary sliding support $b^{11}$ is employed, the head $b'$ will be moved until the bands are brought into the proper contacting position, after which, the current being turned on, the hand-lever $b^{12}$ is moved, causing the support $b^{11}$ to advance and force the ends of the bands together as they are heated by the current and until the current is broken by the separation of the parts $f^2 f^3$ of the switch, which cuts off the current. When properly welded, the bands are released from the holding devices and the wheel removed, there remaining only the closing together of the separated ends of the rubber over the joint of the wires or bands. As soon as the bands are unclamped by the holding devices $c$ and $c'$ these devices will assume their normal position to receive the next set of bands if the spring and turning-plate are employed. If the slidingly-movable holding devices are employed, then they will be moved by manual means to their proper position. When the rubber tire is mounted in a metal channel-rim, an insulating-strip $h^2$, of rubber or other suitable insulating material, should be placed between the jaws and the metal rim prior to the welding process in order to prevent short-circuiting.

It is obvious that the swivelly-mounted or adjustable holding device may be mounted on a stationary head, while the other holding device would be mounted on a movable head—that is to say, either one of the holding devices could be made movable laterally with reference to each other—or, if desired, they might both be laterally movable; but in practice one would ordinarily be stationary and the other movable to or from the normally-stationary holding device in order to vary the distance between the holding devices, so as to secure the proper adjustment and means for uniting the ends of the encircling bands.

Some of the features which are set forth and described herein and not claimed are made the subject-matter of claims in my pending application Serial No. 669,336.

Having thus described my invention, I claim—

1. The combination with a stationary clamping device, and an auxiliary clamping device adjacent thereto, said stationary clamping device being provided with an auxiliary opening or openings adjacent to the clamping portions, said auxiliary clamping device being movable in relation to the stationary clamp, and means for holding said auxiliary clamping device in a fixed position, substantially as specified.

2. The combination with a stationary clamp having band-holding jaws and auxiliary openings, as described, a holding device on one side of said jaws, and a movable clamping and tightening device on the opposite side of said jaws, the jaws of said tightening device being adapted to be brought into line or substantially so with the band-holding jaws of the stationary clamp, substantially as and for the purposes specified.

3. In a device for putting on rubber tires, clamping-jaws having reduced portions to extend into the tire-retaining rim and notched holding-faces to engage the tire-retaining band or bands, said band-holding devices being adapted to be moved so as to vary the distance between the same, and means for positively holding said band-holding device in a proper relative position for joining the ends of the retaining band or bands while the tire is in the channel or tire-holding rim, substantially as and for the purpose specified.

4. In a machine, such as described, band-holding jaws having the notched holding-faces and intermediate holding plate or tongue, means for varying the distance between said band-holding jaws and retaining the same in the proper position for uniting the ends of said bands, substantially as specified.

5. The combination with a wheel-support, band-holding devices, a laterally-movable head for supporting one of said band-holding devices, and a tension device having pivotally-mounted clamps or band-holding devices, substantially as specified.

6. The combination with a supporting-bed having two sets of band-holding devices consisting of clamping-jaws as described, and a tension device arranged adjacent to said band-holding devices, and means on said tension device for clamping the band or bands so as to draw the same across the line of one of said band-holding devices, substantially as and for the purposes specified.

7. The combination with a stationary clamp having the reduced clamping ends as described, said clamp being provided with auxiliary openings back of and substantially in line with the holding-faces of said clamp, a tightening device arranged adjacent to said clamp and adapted to move in relation thereto, and means, substantially as described, for holding the said tightening device in a fixed position with reference to said clamp, substantially as specified.

8. The combination with a wheel-support, of band-holding devices arranged adjacent to each other and separable laterally, one of said band-holding devices being adjustable to different angular positions with reference to the other holding device, and a tension device having clamping means whereby the bands encircling the wheels may be tightened while in one position, and the ends thereof secured and moved to a different position for uniting, substantially as specified.

9. In a rubber-tire-setting device, two sets of band-holding devices, one set being angularly adjustable as described, and means for varying the distance between the respective sets of holding devices, a tension device with means for engaging the bands, and the electrical conductors connected to said holding devices, substantially as specified.

10. The combination with a supporting-bed, the band-holding devices as described, one set of band-holding devices being adjustably mounted and adapted to normally stand at an angle to the other set, a movable head for supporting one of said band-holding devices, and means for changing the position of said head to vary the distance between said holding devices, a tension device arranged at an angle to the line of movement of said head and on a line substantially at right angles to the angularly-arranged holding device, said angularly-arranged holding device being adapted to be moved so as to stand parallel with and adjacent to the other holding device, substantially as and for the purpose specified.

11. The combination with the supporting-bed, the band-holding devices each consisting of a stationary jaw and a movable jaw, and an intermediate clamping-plate, a laterally-movable head for supporting one of said holding devices, and an electrical connection to the intermediate plates of each of said holding devices, substantially as specified.

12. The combination with the supporting-bed, the laterally-movable head thereon, a pivoted or swivelly-mounted plate supporting a band-holding device, a spring connected to said plate, and a stop to determine the movement of said plate and a second band-holding device, one of said band-holding devices being mounted on said head, substantially as specified.

13. The combination with the supporting-bed, of independent band-holding devices, one of said band-holding devices being swivelly or pivotally mounted as described, a spring for normally moving said holding device to the normal position, and an adjustable stop to determine the position of said holding device when moved against the tension of said spring, and means, substantially as described, for varying the distance between the respective holding devices, substantially as specified.

14. A supporting-bed, a stationarily-mounted holding device thereon, a pivotally-mounted holding device adjacent thereto, means for varying the distance between said holding devices, a tension device arranged at an angle to the line of movement of said holding devices, one set of said holding devices being cut away on a line with the plane of said tension device, substantially as and for the purpose specified.

15. A supporting-bed, independent band-holding devices thereon, means for varying the distance between said band-holding devices, one of said band-holding devices being angularly movable with reference to the other, a band-tightening device arranged at an angle to the line of travel of said holding devices in moving to or from each other, and auxiliary openings in one of said holding devices on a line with the movement of said tension device, substantially as specified.

16. A supporting-bed, a stationary band-holding device thereon, a movable head, an auxiliary movable support on said movable head, a pivotally-mounted plate on said auxiliary support, a band-holding device on said plate, means for moving said plate, electrical conductors connecting said band-holding devices and a switch adapted to be operated by the movement of said head to break the circuit of said conductors, substantially as specified.

17. A supporting-bed, a stationarily-mounted holding device thereon, a laterally-movable head and a pivotally-mounted holding device on said head, a hollow shaft forming the pivot of said holding device and electrical connections to said holding devices, one of which extends through said hollow shaft, substantially as specified.

18. The combination with the pivotally-mounted holding device, and a normally-stationary holding device as described, each of said holding devices consisting of a movable and a stationary jaw, and an auxiliary plate between said jaws, a hollow shaft forming a journal for said pivoted holding device, and electrical conductors connected to said auxiliary plates, one of said conductors passing through said hollow shaft or journal, substantially as specified.

19. The combination with the band-holding devices as described, and a band-tightening device arranged at an angle to the plane of said band-holding devices, one of which is provided with auxiliary openings in line with the movement of said tightening device, and an adjustable wheel-support, substantially as and for the purpose specified.

In testimony whereof I have hereunto set my hand this 10th day of August, A. D. 1897.

ARTHUR W. GRANT.

Witnesses:
 CHAS. I. WELCH,
 JNO. S. GREEN.